United States Patent Office 2,748,053
Patented May 29, 1956

2,748,053

SOLUBLE ASCOSIN COMPOSITION AND
METHOD FOR PREPARING SAME

Richard J. Hickey, Havertown, Pa., assignor to Commercial Solvents Corporation, Terre Haute, Ind., a corporation of Maryland No Drawing. Application September 8, 1954,
Serial No. 454,836

9 Claims. (Cl. 167—65)

My invention relates to a water-soluble ascosin composition and to a method for its preparation. More particularly, my invention relates to a composition of ascosin with certain bicarbonates which render the composition soluble in aqueous solvents, and to the process for preparing the composition to obtain these results.

The antifungal agent ascosin is described along with methods for its production and recovery in the pending application U. S. Serial No. 249,815, filed October 4, 1951, now Patent No. 2,723,216, issued November 8, 1955, by Isadore R. Cohen. The fungistatic and fungicidal properties of ascosin, in vitro, are fully described therein. Due to ascosin's relatively safe toxicity level in mice as reported in the above-named application, ascosin has been the subject of large-scale in vivo testing against different fungal infections. This testing has been rendered very difficult, however, because of the very slight solubility of ascosin in aqueous solvents in general, particularly those useful for injection purposes, such as water, saline solution, and buffered salt solution. Because of ascosin's very sparing solubility in aqeous solution, in the past it has proved impossible to inject high potencies of the material in small volumes of solution. It has therefore been necessary to inject extremely large volumes of solution in order to obtain relatively high potencies of ascosin in test animals. When such potencies, on a dilution unit per kilogram of weight basis, are scaled up to the weights of larger animals, it is apparent that the quantities of solution required to obtain equivalent potencies would be virtually prohibitive. This disadvantage of poor solubility in injectable aqueous solutions has proved an acute deterrent to in vivo testing in the past.

I have now discovered a new water-soluble ascosin composition which consists of the lyophilized residue of a solution of ascosin and a member selected from the group consisting of sodium bicarbonate and potassium bicarbonate in a mixture of water and a member selected from the group consisting of pyridine, picolines, lutidines, quinoline, and isoquinoline.

My new water-soluble ascosin composition preferably contains approximately equal weights of ascosin and a bicarbonate member selected from the group consisting of sodium bicarbonate and potassium bicarbonate. My new composition is the result of a process of preparation which comprises dissolving ascosin and not less than an equal weight of sodium bicarbonate or potassium bicarbonate in a mixture of water and one of the heterocyclic amines, such as pyridine, the lutidines, the picolines, quinoline or isoquinoline, and lyophilizing the resulting solution.

The dried ascosin material useful in producing my new water-soluble ascosin composition can be any such ascosin material recovered from a fermentation producing it. The material may range from relatively crude material of about 20,000 to 30,000 du./mg. up to a much more highly purified material of the range of 250,000 to 300,000 du./mg. A dilution is the amount of ascosin which will just inhibit a stock strain of Saccharomyces cerevisiae in one milliliter of Difco phenol red broth supplemented with 1% glucose, at a pH of 7.3, when incubated for 24 hours at 28° C. The material used can be obtained as the result of any of the recovery methods set out in the pending application, Serial No. 249,815 or from any purification processes in addition to such basic recoveries. One such additional purification procedure which produces high potency ascosin material useful in producing my new water-soluble ascosin compositions involves the extraction of ascosin material resulting from the basic recovery procedure with acetone and the extraction into aqueous 1-butanol of the active residue remaining, concentration of the butanol extract under vacuum, and cooling to precipitate a high-potency, more nearly pure ascosin assaying from 200,000 to about 250,000 du./mg. I can, in short, employ any ascosin material for production of my water-soluble ascosin composition. It is obvious, however, that the potency per milligram of my new composition will be dependent on the potency of the starting ascosin material.

Bicarbonates useful in the production of my new water-soluble ascosin composition includes sodium bicarbonate and potassium bicarbonate. I have found that both the sodium and potassium salts are useful in the production of my new composition. I can use an amount of bicarbonate of from an equal weight to two or three times the weight of the ascosin employed. However, the use of more than aproximately an equal weight only serves to dilute the activity of the total solids present after lyophilization. For that reason I prefer to use a weight of bicarbonate approximately equal to the weight of the ascosin.

The mutual solvents necessary in the preparation of my new water-soluble ascosin compositions are a mixture of water and one of the heterocyclic amines selected from the group consisting of pyridine, picolines, lutidines, quinoline, and isoquinoline. Heterocyclic amines suitable for use in mixtures with water as solvents include, pyridine, α-picoline, β-picoline, 2,4-lutidine, 2,6-lutidine, quinoline and isoquinoline.

The concentrations of the heterocyclic amines in the mixed solvents are limited by the freezing points of the mixtures with ascosin and a bicarbonate dissolved therein. The freezing point of the solution must fall between 0° and —20° C. so that it can be conveniently frozen and can be maintained in a frozen state under the vacuum necessary for lyophilization.

For those of the heterocyclic amines which are miscible in practically all proportions with water, such as pyridine, the picolines, and 2,6-lutidine mixtures ranging from about 10% to about 60% of the heterocyclic amines with water are useful in my process. For those sparingly water-miscible heterocyclic amines, such as quinoline, isoquinoline, and 2,4-lutidine mixtures ranging from about 10% to about 95% of the heterocyclic amines with water can be employed because of their generally higher freezing points. I have found that heterogeneous mixtures of these sparingly water-miscible heterocyclic amines and water can be used as solvents and can be lyophilized. I prefer to use mixtures of from about 30% to about 50% of any of the heterocyclic amines with water as solvents in my process.

My new water-soluble ascosin composition resulting from the lyophilization of the solution of ascosin and at least an equivalent weight of a bicarbonate salt in the above-named mixed solvents may then be packaged in a convenient form. It may be retained as a bulk material for subsequent packaging. I have found it convenient to fill the solution of ascosin and bicarbonate in the mixed solvent, the whole rendered sterile by filtration through a Seitz filter, directly into sterile vials to lyophilize the solution in these vials. Thereupon the sterile vials may be capped under sterile conditions and stored for future use.

The following examples serve to illustrate my invention. It is not intended that my invention be limited to the specific amounts, procedures, or proportions set forth therein, but I intend for my invention to be limited only by the scope of this specification and the appended claims.

EXAMPLE I

In this example vials of ascosin containing between about 4.7 and 4.9 mg. of material per vial lyophilized from 50% aqueous pyridine solution were employed. The ascosin material originally present in the vials assayed an average of about 48,000 dilution units per milligram. The contents of one of these vials was dissolved in 10 ml. of 50% aqueous pyridine and of another in 10 ml. of aqueous saline solution containing 2 mg./ml. of sodium bicarbonate. All of the material did not dissolve in the second solvent and the precipitated solid from that solvent was assayed by dissolving in 2 ml. of 50% aqueous pyridine. The results of this experiment indicate that only about 12 to 14 per cent of the ascosin material present in the vial tested was soluble in the aqueous saline solution containing sodium bicarbonate. These results are set out in Table IA below.

*Table IA*

| Solvent | du./ml. | Total du. |
|---|---|---|
| 1. 10 mls. 50% aqueous pyridine | 16,000 | 160,000 |
| 2. 10 mls. aqueous saline cont. NaHCO₃ | 2,000 | 20,000 |
| 3. Ppt. from 2 in 2 ml. 50% aq. pyridine | 64,000 | 128,000 |

Four additional vials from the same lot of ascosin material containing from 4.7 to 4.9 mg. per vial were submitted to the following test. The ascosin material in each vial was dissolved in 0.7 ml. of 50% aqueous pyridine solution. To each of two of the vials there was then added 5 mg. of dry sodium bicarbonate. The entire lot of four vials was then lyophilized in the same manner as previously under standard condition of 10 to 15 microns vacuum for 24 hours. The contents of the four lyophilized vials were then dissolved in 10 ml. of aqueous saline solution containing 2 mg./ml. of sodium bicarbonate. The results of this experiment, set out in Table IB below showed that the lyophilization of a solution containing both the ascosin material and the sodium bicarbonate resulted in a much more soluble composition giving a clear solution in aqueous saline.

*Table IB*

| NaHCO₃ Added mg./vial | Solubility in Aqueous Saline and Bicarbonate Solution |
|---|---|
| 0 | Incomplete, Ppt. settled. |
| 5 | Complete, Clear Solution. |

EXAMPLE II

There were mixed together 500 mg. of dry ascosin material assaying an average potency of about 18,600 dilution units per mg. and 500 mg. of potassium bicarbonate. This dry mixture was dissolved in 25 ml. of 50% aqueous pyridine and sterilized by filtration through a Seitz filter. The filtrate was dispensed into some 50 sterile 10 ml. vials at the rate of approximately 0.5 ml./vial. The solutions in the vials were then lyophilized for about 18 hours at less than 10 microns vacuum and capped with sterile caps. There was found to be from 20 to 21.2 mg. of ascosin per vial which assayed an average potency of about 13,000 du./mg., or about 26,000 du./mg. on a potassium bicarbonate-free basis. A test of solubility of the lyophilized ascosin and potassium bicarbonate composition in 10 ml. of aqueous saline solution containing 2 mg./ml. sodium bicarbonate resulted in complete solution and a clear, injectable solution.

EXAMPLE III

In this experiment a more highly purified sample of ascosin material having a mean assay of about 211,000 du./mg. was converted into water-soluble ascosin composition. A dry mixture was prepared of 1 gram of the high potency ascosin material with 1 gram of sodium bicarbonate and this mixture dissolved in 50 ml. of a mixture of 30% pyridine in water. The resulting solution was filtered through a Seitz filter and the filtrate was added aseptically at the rate of 0.5 ml./vial to 106 10-ml. sterile vials. The material in the vial was subjected to lyophilization in the usual manner at from 15 to 25 microns for 24 hours. The lyophilized material in the vial weighed from 15.1 to 15.2 mg./vial, having a mean assay of about 105,000 dilution units/mg. The ascosin composition which resulted from this procedure was found to be freely soluble in 10 ml. each of distilled water for injection, isotonic sodium chloride solution, and saline solution containing sodium bicarbonate.

EXAMPLE IV

Vials of my new ascosin compositions using solvent mixtures of several heterocyclic amines for lyophilization were prepared. The indicated amounts of ascosin and potassium bicarbonate were weighed into 10 ml. vials. There was added to each vial 0.1 ml. distilled water and 0.2 ml. of the heterocyclic amine solvent and the vials were shaken to secure solution. Thereafter 0.2 ml. of water was added to each vial to make the solvent mixtures 40% heterocyclic amines and 60% water. The vials were then lyophilized in the same manner as in Example I above and the contents reconstituted in 5 ml. of distilled water. The reconstituted solutions were inspected for clarity and completeness of solution of the ascosin composition. The results are set out in Table II below.

*Table II*

| Solvent Mixture 40% with Water | Ascosin mgs. | KHCO₃ mgs. | Appearance of Solution upon Reconstitution in Water |
|---|---|---|---|
| Pyridine | 7.5 | 7.5 | Good—Clear |
| α-Picoline | 7.5 | 7.5 | Good—Clear |
| 2,6 Lutidine | 15 | 15 | Good—Clear |
| Quinoline | 7.5 | 7.5 | Good—Clear |
| Isoquinoline | 7.5 | 7.5 | Good—Clear |

While the above examples describe the preferred embodiment of my invention, it will be understood that departures therefrom may be made within the scope of the specification and claims. In general it may be said that any modifications or equivalents that would ordinarily occur to those skilled in the art are to be considered as lying within the scope of my invention.

Now having disclosed my invention, what I claim is:

1. A water-soluble ascosin composition which consists of the lyophilized residue of a solution in a mixture of water and a member selected from the group consisting of pyridine, picolines, lutidines, quinoline and isoquinoline of ascosin and at least about a weight equal to that of the ascosin of a member selected from the group consisting of sodium bicarbonate and potassium bicarbonate.

2. A process for preparing a water-soluble ascosin composition which comprises dissolving ascosin and at least about an equal weight of a member selected from the group consisting of sodium bicarbonate and potassium bicarbonate in a mixture of water and a member selected from the group consisting of pyridine, picolines, lutidines, quinoline, and isoquinoline, and lyophilizing the resulting solution.

3. A water-soluble ascosin composition which consists of the lyophilized residue of a solution in a mixture of water and pyridine of ascosin and at least about a weight equal to that of the ascosin of a member selected from the group consisting of sodium bicarbonate and potassium bicarbonate.

4. A water-soluble ascosin composition which consists of the lyophilized residue of a solution in a mixture of water and α-picoline of ascosin and at least a weight equal to that of the ascosin of a member selected from the group consisting of sodium bicarbonate and potassium bicarbonate.

5. A water-soluble ascosin composition which consists of the lyophilized residue of a solution in a mixture of water and 2,6-lutidine of ascosin and at least a weight equal to that of the ascosin of a member selected from the group consisting of sodium bicarbonate and potassium bicarbonate.

6. A water-soluble ascosin composition which consists of the lyophilized residue of a solution in a mixture of water and quinoline of ascosin and at least a weight equal to that of the ascosin of a member selected from the group consisting of sodium bicarbonate and potassium bicarbonate.

7. A water-soluble ascosin composition which consists of the lyophilized residue of a solution in a mixture of water and isoquinoline of ascosin and at least a weight equal to that of the ascosin of a member selected from the group consisting of sodium bicarbonate and potassium bicarbonate.

8. A process for preparing a water-soluble ascosin composition which comprises dissolving ascosin and at least about an equal weight of a member selected from the group consisting of sodium bicarbonate and potassium bicarbonate in a mixture of water and pyridine and lyophilizing the resulting solution.

9. A process for preparing a water-soluble ascosin composition which comprises dissolving ascosin and at least about an equal weight of a member selected from the group consisting of sodium bicarbonate and potassium bicarbonate in a mixture of water and α-picoline and lyophilizing the resulting solution.

References Cited in the file of this patent

UNITED STATES PATENTS

| | | |
|---|---|---|
| 2,032,890 | Schoeller | Mar. 3, 1936 |
| 2,066,302 | Reichel | Dec. 29, 1936 |
| 2,149,304 | Masucci | Mar. 7, 1939 |

OTHER REFERENCES

Hickey et al.: "Ascosin." Antibiotics and Chemotherapy, September 1952, pages 472–483.

Frankel: "Arzneimittel-Synthese." Sechste umgearbeitete Auflage, Springer, Berlin, 1927, pages 222 and 223, IX. Wasserlöslichmachen von Arzneimitteln.